Patented June 5, 1928.

1,672,487

UNITED STATES PATENT OFFICE.

GEORGE W. FREIBERG, OF ST. LOUIS, MISSOURI.

PROCESS FOR MAKING ACETONE AND BUTYL ALCOHOL.

No Drawing.   Application filed December 29, 1922.   Serial No. 609,756.

This invention relates to the manufacture of acetone and butyl alcohol by fermentation of carbohydrate-containing mashes.

The object of my invention is to provide a fermentation process for producing acetone and butyl alcohol that will result in a comparatively high yield of neutral products such as acetone and butyl alcohol.

In producing acetone and butyl alcohol on a commercial scale by fermentation of carbohydrate-containing mashes, there is frequently a relatively high and abnormal formation of acids, with a correspondingly low production of neutral products such as acetone and butyl alcohol. I have discovered that if the water used in making the mash and in cooking the mash be treated in such a way as to eliminate or partly remove certain substances contained therein, that a tendency toward acid production will be reduced with a resulting higher yield of neutral products. I have also observed that if certain substances which may be found in natural waters are added to water which has been subjected to treatment, a tendency toward acid production will be induced with a resultant low yield of neutral products. I have also observed that if certain bacteria, other than the aceton-butyl alcohol producing bacteria, which may survive during certain acetone butyl alcohol fermentations are introduced with the acetone-butyl alcohol producing bacteria into a carbohydrate-containing mash suitably prepared with water which has been subjected to means of treatment, that the proportion of these foreign bacteria will be greatly reduced during the fermentation or may even be eliminated entirely.

From the information obtained by the above mentioned discoveries I have evolved a process for producing acetone and butyl alcohol by fermentation, which is characterized by treating the water used in making the mash and in cooking the mash, in such a way as to remove or reduce the quantity of those constituents of the water which tend to promote the formation of a high acidity. The treatment of the water will vary according to the chemical composition of the water, but usually it will be sufficient to treat the water in a way such as will remove or reduce the quantity of those constituents which cause temporary or permanent hardness, such as the calcium and magnesium compounds in the water, and thereafter removing the suspended material in any suitable way, such, for example, as by sedimentation or filtration. Any preferred method may be used for treating the water, such as by means of caustic soda, lime and soda ash, or the permutite process, i. e. by precipitants or zeolites, and the nature or extent of treatment of the water will, of course, vary in accordance with the nature and quantity of the substances in the water which are to be removed or reduced. After the water has been treated the suspended material is removed in any suitable way before it is mixed with the substance from which the mash is formed. If live steam is used to cook the mash, as is the general practice, it is necessary that the water from which the steam is formed be treated and filtered the same way as the water used to form the mash, or subjected to such other action so as to eliminate the possibility of any of the deleterious substances in the water being incorporated in the mash, as might occur in the event water is carried over with the steam in the operation of cooking the mash.

In the foregoing description of my process it is assumed that the material containing the fermentable carbohydrate does not in itself contain a sufficient quantity of such substances as will induce the formation of a high acidity.

Having thus described my invention, what I claim as new and desire to secure by Letters Patent is:

1. A process for producing acetone and butyl alcohol by fermenting a carbohydrate-containing mash with bacteria capable of producing acetone and butyl alcohol, characterized by subjecting the water used in the process to the action of water softening agents so as to reduce the amount of calcium and magnesium compounds originally present in the water which have a tendency to stimulate acid formation and subsequently removing the suspended material.

2. A process for producing acetone and butyl alcohol, characterized by forming a mash from carbohydrate material and water which has been treated with an effective zeolite and filtered so as to remove compounds of calcium and magnesium, which have a tendency to stimulate acid formation, and thereafter fermenting said mash with bacteria capable of producing acetone and butyl alcohol.

3. In a process of fermenting a carbohydrate-containing mash with bacteria capable of producing acetone and butyl alcohol, the step of treating the water used in the process with a suitable water softening agent and subsequently removing the suspended material from the water.

4. A process for producing acetone and butyl alcohol by fermenting a carbohydrate-containing mash with bacteria capable of producing acetone and butyl alcohol, characterized by using in the operation of cooking the mash, water which has previously been treated with water softening agents so as to reduce the amount of calcium and magnesium compounds which stimulate acid formation, and subsequently preventing the incorporation of suspended material into the mash.

GEORGE W. FREIBERG.